United States Patent [19]

Leiter

[11] Patent Number: 4,814,814
[45] Date of Patent: Mar. 21, 1989

[54] PROCESS AND DEVICE FOR THE INTRODUCTION, VISUALIZATION AND/OR RECORDING OF A VARIABLE METERING SPOT INTO A RAY PATH OF A CAMERA FOR OPTICAL INSTRUMENTS

[75] Inventor: Herbert Leiter, Wetzlar, Fed. Rep. of Germany

[73] Assignee: Ernst Leitz Wetzlar GmbH, Wetzlar, Fed. Rep. of Germany

[21] Appl. No.: 201,161

[22] Filed: Jun. 1, 1988

Related U.S. Application Data

[63] Continuation of Ser. No. 931,723, Oct. 22, 1986.

[30] Foreign Application Priority Data

Feb. 23, 1985 [DE] Fed. Rep. of Germany ....... 3506492

[51] Int. Cl.$^4$ .................. G03B 7/08; G03B 17/48; G03B 21/00
[52] U.S. Cl. .................................... 354/432; 354/62; 354/227.1
[58] Field of Search .................. 354/410, 429–432, 354/442, 476, 478, 479, 480, 481, 483, 227.1, 79

[56] References Cited

U.S. PATENT DOCUMENTS

| | | | |
|---|---|---|---|
| 3,724,349 | 4/1973 | Von Belvard et al. | 354/429 |
| 4,050,814 | 9/1977 | McFadden | 354/227.1 |
| 4,054,890 | 10/1977 | Shimomura | 354/227.1 |
| 4,218,119 | 8/1980 | Schickedanz | 354/432 |
| 4,309,091 | 1/1982 | Fukuhara et al. | 354/432 |
| 4,364,650 | 12/1982 | Terashita et al. | 354/432 |
| 4,494,853 | 1/1985 | Watanabe | 354/481 |
| 4,509,848 | 4/1985 | Katsoma et al. | 354/481 |
| 4,534,639 | 8/1985 | Konishi et al. | 354/481 |
| 4,591,253 | 5/1986 | Hecker et al. | 354/227.1 |

Primary Examiner—Russell E. Adams
Attorney, Agent, or Firm—Foley & Lardner, Schwartz, Jeffery, Schwaab, Mack, Blumenthal & Evans

[57] ABSTRACT

Processes for the introduction, visualization and/or recording of a variable detail metering field stop into part ray paths of a camera for optical instruments, for example microscopes, are described. In addition, appropriate devices are specified. They contain a reversibly illuminable multifield matrix (4), which is provided, at a fixed location, in a plane which is conjugated with the eyepiece intermediate image plane of the optical instrument. The multifield matrix (4) is activated by a processor (22) in such a fashion that the transmission characteristics of the entire multifield matrix (4), or of at least one geometrical subregion of this matrix, are altered spontaneously reversibly, the following process steps being carried out: an object (3) is imaged on the multifield matrix (4); all fields of the multifield matrix (4) are cleared one after the other while simultaneously measuring the light passing through each cleared field; the measured values obtained are fed to a computer (23); the individual measured brightness signals are evaluated by the computer (23) and the measured values of those fields which feature object image structures are stored; all fields of the multifield matrix (4) which feature object image structures are cleared by the processor (22); the ideal exposure time is determined by the computer (23); the time values determined by the computer (23) are passed on to the camera shutter 7, which then carries out its function in a known fashion.

39 Claims, 3 Drawing Sheets

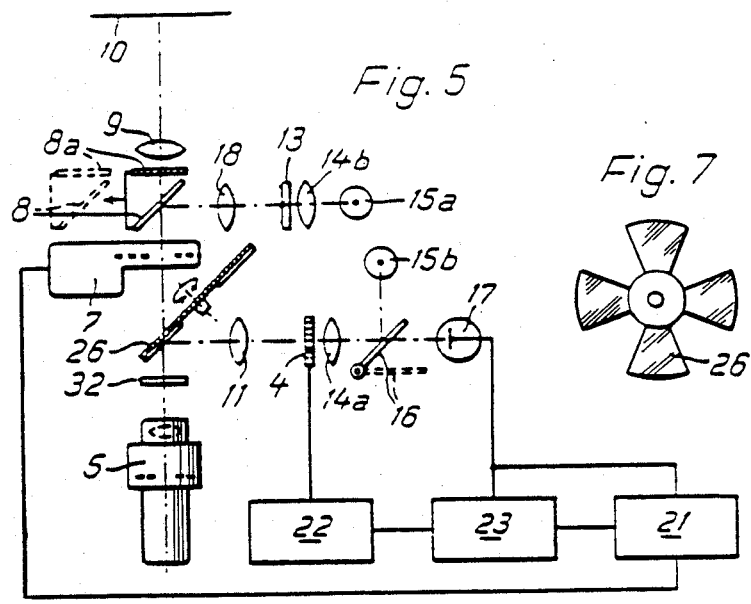
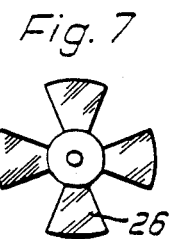
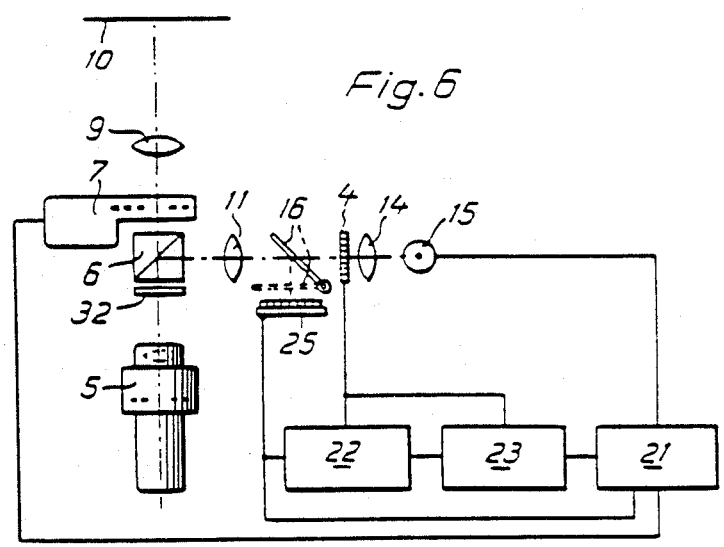

PROCESS AND DEVICE FOR THE INTRODUCTION, VISUALIZATION AND/OR RECORDING OF A VARIABLE METERING SPOT INTO A RAY PATH OF A CAMERA FOR OPTICAL INSTRUMENTS

This application is a continuation of application Ser. No. 931,723, filed Oct. 22, 1986.

The invention relates to a process for the introduction and/or visualization and/or recording of at least one metering spot, of variable shape, size and location, into or in the viewing and/or exposure and/or metering ray path of a camera for optical instruments, particularly microscopes, and also a device for carrying out this process.

German Pat. No. 2,619,853 discloses an attachment camera, with exposure metering, for microscopes which has the purpose of photographically recording an object or object detail. In this known device, a metering field stop, defining the detail metering field, is arranged, so as to be mechanically adjustable, in a plane conjugated to the eyepiece intermediate image.

Several disadvantages are associated with this state of the art. Thus, although the detail metering field stop can be mounted to be variable in size, shape and location, only certain pre-specified stop geometries, such as squares, rectangles or circles, can be achieved by mechanical adjustment of the stop segments. Individual matching of the shape of the detail metering field stop to the geometry of, for example, an angularly shaped object detail (for example "boomerang" shape) or of an object detail with asymmetrical, irregular or polyganol indentations or bulges is, in contrast, not possible. A serious disadvantage is, furthermore, that mechanical adjusting means must be provided for the detail metering field stop itself or for its individual segments.

The present invention therefore has the object of specifying a process, of the type mentioned initially, in which the disadvantages described can, in principle, no longer occur; and which, in addition, can be employed with more variations, can be matched precisely to all object detail shapes which occur, and which, above all, is equipped with extended exposure dynamics.

In the process according to the invention, for the introduction and/or visualization and/or recording of at least one metering spot, of variable shape, size and location, into or in the viewing and/or exposure and/or metering ray path of a camera for optical instruments, particularly microscopes, this object is achieved in that a fixed-location, optionally reversibly illuminable multifield matrix, provided in the metering ray path in a plane which is conjugated with the eyepiece intermediate image plane of the optical instrument, is activated by a processor in such a fashion that the transmission characteristics of the entire multifield matrix, or of at least one geometrical subregion of this matrix are altered, spontaneously reversibly, according to the following process steps:

(a) An object is imaged on the multifield matrix;

(b) After a release button is operated, the processor clears all fields of the multifield matrix individually one after the other, the light passing through each cleared field simultaneously being metered and the measured values obtained being fed to a computer;

(c) The computer evaluates the individual measured brightness signals and stores the measured values of those fields which feature object image structures or parts of structures;

(d) The processor clears all fields which feature object image structures or parts of structures;

(e) In collaboration with a photoelectric metering device, the computer determines the ideal exposure time by determining the ratio of the cleared fields to the total number of all fields of the multifield matrix, and also by taking into account the geometry of the cleared subregions of the multifield matrix;

(f) The time values determined by the computer are fed to a photographic shutter control unit, which then carries out its function in a manner which is known per se.

The object is also achieved, in an alternative fashion, in that a fixed-location multifield matrix, provided in the metering ray path in a plane which is conjugated with the eyepiece intermediate image plane of the optical instrument, is controlled by a processor in such a fashion that the transmission characteristics of the entire multifield matrix, or of at least one geometrical subregion of the matrix, are altered, spontaneously reversibly, according to the following process steps:

(a) An object is imaged on the multifield matrix;

(b) After a release button is operated, the processor clears all fields of the multifield matrix individually one after the other, the light passing through each cleared field simultaneously being metered by a photoelectric metering device and the measured values obtained being fed to a computer;

(c) The computer evaluates the individual measured brightness signals and stores the measured values of those fields which feature object image structures or parts of structures;

(d) The processor clears all fields which feature object image structures or parts of structures;

(e) The ideal exposure time is determined by determining the ratio of the cleared fields to the total number of all fields of the multifield matrix, and also by taking into account the geometry of the cleared subregions of the multifield matrix;

(f) The time values determined by the computer are fed to a photographic shutter control unit, which then carries out its function in a manner which is known per se;

(g) The object image is subsequently compared visually with the metering spot image by optical superimposition of both images in the eyepiece intermediate image plane of the optical instrument by reverse illumination of the multifield matrix.

The object is furthermore achieved, in an alternative fashion, in that a fixed-location multifield matrix, provided in the metering ray path in a plane which is conjugated with the eyepiece intermediate image plane of the optical instrument, is activated by a processor in such a fashion that the transmission characteristics of the entire multifield matrix, or of at least one geometrical subregion of this matrix, are altered, spontaneously reversibly, according to the following process steps:

(a) An object is imaged on the multifield matrix;

(b) After a metering button is operated, the processor clears all fields of the multifield matrix individually one after the other, the light passing through each cleared field simultaneously being metered by a photoelectric metering device and the measured values obtained being fed to a computer;

(c) The computer evaluates the individual measured brightness signals and stores the measured values of those fields which feature object image structures or parts of structures;

(d) The processor clears all fields which feature object image structures or parts of structures;

(e) The ideal exposure time is determined by determining the ratio of the cleared fields to the total number of all fields of the multifield matrix and also taking into account the geometry of the cleared subregions of the multifield matrix;

(f) The object image is compared visually with the metering spot image by optical superimposition of both images in the eyepiece intermediate image plane of the optical instrument by reverse illumination of the multifield matrix;

(g) The time values determined by the computer are subsequently fed, manually or automatically, to the photographic shutter control unit and displayed, and the latter then, after a release button is operated, carries out its function in a manner which is known per se.

The object is furthermore achieved, in an alternative fashion, in that a diode array, provided in the metering ray path in a first plane which is conjugated with the eyepiece intermediate image plane of the optical instrument and an optionally reversibly illuminable multifield matrix, arranged in a second plane, conjugated with the first plane, are activated by a processor in such a fashion that the metering field characteristics of the diode array and the transmission characteristics of the entire multifield matrix are altered, spontaneously reversibly, according to the following process steps:

(a) An object is imaged on the diode array;

(b) The processor activates all fields of the diode array individually one after the other, the light hitting each activated field simultaneously being metered and the individual measured values being fed to the computer;

(c) The computer evaluates the individual measured brightness signals and stores the measured values of those fields of the diode array which feature object image structures or parts of structures;

(d) The computer determines the ideal exposure time by determining the ratio of the fields having object structures to the total number of all fields, and by taking into account the intensity of the metering signal and the geometry of the fields of the diode array which are involved in the metering;

(e) The time values determined by the computer are fed to a photographic shutter control unit, which then carries out its function in a manner which is known per se;

(f) Those fields of the multifield matrix are cleared which correspond to the fields of the diode array which are relevant to the object image structures, and a mirror, which, in its functional position, provides the optical coupling of the diode array to the metering ray path, is swiveled away;

(g) The object image is subsequently compared visually to the metering spot image, formed on the multifield matrix, by optical superimposition of both images in the eyepiece intermediate image plane of the optical instrument by reverse illumination of the multifield matrix.

The object is furthermore achieved, in an alternative fashion, in that a diode array, provided in the metering ray path in the first plane which is conjugated with the eyepiece intermediate image plane of the optical instrument, and an optionally reversibly illuminable multifield matrix, arranged in a second plane which is conjugated with the first plane, are activated by a processor in such a fashion that the metering field characteristics of the diode array and the transmission characteristics of the entire multifield matrix are altered, spontaneously reversibly, according to the following process steps:

(a) An object is imaged on the diode array;

(b) After a metering button is operated, the processor activates all fields of the diode array individually one after the other, the light hitting each activated field simultaneously being metered and the individual measured values being fed to a computer;

(c) The computer evaluates the individual measured brightness signals and stores the measured values of those fields of the diode array which feature object image structures or parts of structures;

(d) The computer determines the ideal exposure time by determining the ratio of the fields having object structures to the total number of all fields, and furthermore by determining the intensity of the metering signal, and finally by taking into account the geometry of the fields of the diode array which are involved in the metering;

(e) The object image is subsequently compared visually to the metering spot image, formed on the multifield matrix, by optical superimposition of both images in the eyepiece intermediate image plane of the optical instrument by reverse illumination of the multifield matrix;

(f) The time values determined by the computer are fed to a photographic shutter control unit and displayed, the shutter control unit, after a release button is operated, then carrying out its function in a manner which is known per se.

Finally, the object is also achieved by a device for carrying out one of the processes specified, which device comprises an optical viewing instrument with associated camera—particularly an attachment or built-in camera which acts together with a microscope—with a device for measuring the brightness of an object detail and with means for visualization of the detail field and/or of the object image in the intermediate image plane of the eyepiece of the optical viewing instrument, a detail metering field stop arrangement, defining the detail metering field, being arranged in a functional plane, which is a plane conjugated with the eyepiece intermediate image, in a metering ray path which is optically coupled, via a ray deflector which is located in the optical axis of the viewing instrument, with the image-forming ray path, and—if appropriate—a beam splitter, which reflects format markings, hair-line crosses etc. into the metering or viewing ray path, being arranged in the metering ray path, the detail metering field stop arrangement being mounted so as to be at a fixed location and being designed as a multifield matrix having transmission characteristics, of each of its fields, which can be altered spontaneously reversibly.

In the processes according to the invention, it can additionally be provided that the measured values determining the exposure time are stored and multiple exposures of one and the same object are carried out using them. It is also possible that the geometric subregion which can be activated comprises at least one field or at least one line of the multifield matrix or of the diode array or that the subregion which can be activated comprises at least one physically adjacent group of fields or lines in the multifield matrix or in the diode array. The processor advantageously simultaneously clears the fields of the multifield matrix which belong to a line in order that the ideal shape, size and location of the metering spot may be determined, so that all horizontal lines and subsequently all vertical lines are activated successively, a metering signal of different intensity, depending on the respective image structure detail, is stored from each line and subsequently evaluated by the computer, the clearing only subsequently being carried out for those fields which feature object image structures or parts of structures. According to a further design of the process according to the invention, the contrast ranges which are acceptable for recording purposes can previously be input (pre-programmed) into the computer, taking into account the exposure latitude of the appropriate film used in the camera of the optical instrument, for the determination of the desired shape, size and position of the metering spot or metering spots. On the other hand, the contrast range which is acceptable for recording purposes can alternatively be entered manually into the computer, matching the exposure latitude of the appropriate film used in the camera on the optical instrument, for the determination of the desired shape, size and position of the metering spot or metering spots.

According to a further embodiment, the computer can be programmed with a program correction factor, depending on the film material used in each case, either for greater emphasis and weighting of the maximum values of the signal (in the case of positive films) or the minimum signal values (in the case of negative films).

It is also possible for the computer to automatically correct or compensate for any transmission inhomogeneities of individual fields or lines, in the activated state, of the multifield matrix or of the diode array, and the optically necessary decrease in brightness towards the edge of the field of view. The fields or lines activated by the processor can alternatingly change, individually or in groups, their transmission characteristics in a rapid and prespecifiable interval sequence. According to an advantageous development of the present invention, the shape(s), size(s) and location(s) of the metering spot(s) can be determined manually by tracing the contour(s) of the object image and can then be stored. It is also possible for the processor to initially clear one field lying in the central region of the multifield matrix and then to clear the neighboring fields one after the other—optionally individually or in groups. During this, the successive clearing of the neighboring fields can advantageously be carried out along a spiral line originating from the center of the multifield matrix.

The device according to the invention can be designed in such a fashion that the multifield matrix is assigned a processor which is connected to a storage and computer unit which is itself connected functionally to the processor and to a control unit which controls a shutter present in the camera according to the measured brightness values determined.

In a particularly advantageous embodiment of the present invention, a diode array is arranged, additionally to the multifield matrix, in a plane which is conjugated with the eyepiece intermediate image plane in the region of the metering ray path, the individual diodes of the diode array being linked according to their coordinates with the corresponding fields of the multifield matrix. The diode array can be linked, in an analogous fashion to the multifield matrix, to the processor of a computer and storage unit and to the control unit. In a further version of the device according to the invention, the beam deflector can be a rotating sectored mirror which is arranged in the image-forming ray path in such a fashion that the fully-mirrored sector which is in the active position deflects the metering ray path in the direction of the multifield matrix, and that a mirror, with dark flap which is post-positioned in the direction of the film plane and mechanically connected to the mirror, which is mounted so that it can be slid in and out and which, in the active position, deflects a separate part ray path into the optical axis of the viewing instrument initially in the direction of the object, is provided in the optical axis of the viewing instrument between the shutter and the camera lens. The device here can be designed so that the part ray path proceeds from a light source which is positioned behind a field lens, a plate provided with geometrical identification markings, particularly hair-line and format markings, and then a further lens as further optical components. The multifield matrix can comprise an electro-optical or ferroelectric or magneto-optical material. According to a particularly preferred embodiment, it is a liquid crystal matrix. In a special case, the multifield matrix can contain nematic liquid crystals with positive dielectric anisotropy. It can likewise be an electrochromic or electrophoretic matrix. It is also possible for the individual fields (groups of fields) or lines (groups of lines) of the multifield matrix to comprise different matrix materials. The multifield matrix here can be designed in such a fashion that the different matrix materials are distributed amongst the individual fields (groups of fields) or lines (groups of lines) of the multifield matrix in such a fashion that, in each case,—preferably centrosymmetrical—zones or sectors or other geometrically structured—for example in a checkered pattern—subregions of the matrix of identical surface areas, but furnished with different matrix materials, alternate with one another. All individual fields of the multifield matrix are advantageously of the same geometry and have the same surface area. The geometrical shape of each individual field can be a square or a rectangle or a rhombus or a parallelogram or a trapezoid or a triangle or a hexagon. It can be expedient, for particular metering processes, for all individual fields of the multifield matrix to have surface geometries which differ from one another while having the same surface areas. On the other hand, versions are also advantageous in which some of the individual fields of the multifield matrix are designed as equal surface area format limiting symbols or centering symbols—for example as crosswire(s), arrow(s), "L"- or "V"- shaped angle(s), 90° arc(s), circular ring(s) etc—and preferably arranged point-symmetrically, relative to the multifield matrix center, on the multifield matrix. The multifield matrix can have a polar coordinate structure proceeding radially from its center, all individual fields produced expediently being of the same surface area. Finally, the device according to the invention can be designed in such a fashion that at least two multifield matrices of the same or different geometrical or physicochemical design are layered on one another in a sandwich fashion, can be separately activated by the processor, and are arranged in the metering ray path so that they can be linked with one another bifunctionally.

Exemplary embodiments of the present invention are represented schematically in the drawings, in which:

FIG. 5 shows a third version of an attachment camera, for microscopes, having a multifield matrix and separate format marking;

FIG. 6 shows an attachment camera, for microscopes, having a multifield matrix and having a diode array as light sensor; and FIG. 7 shows a detailed view of the rotating mirror shown in FIG. 5.

Figure 1:
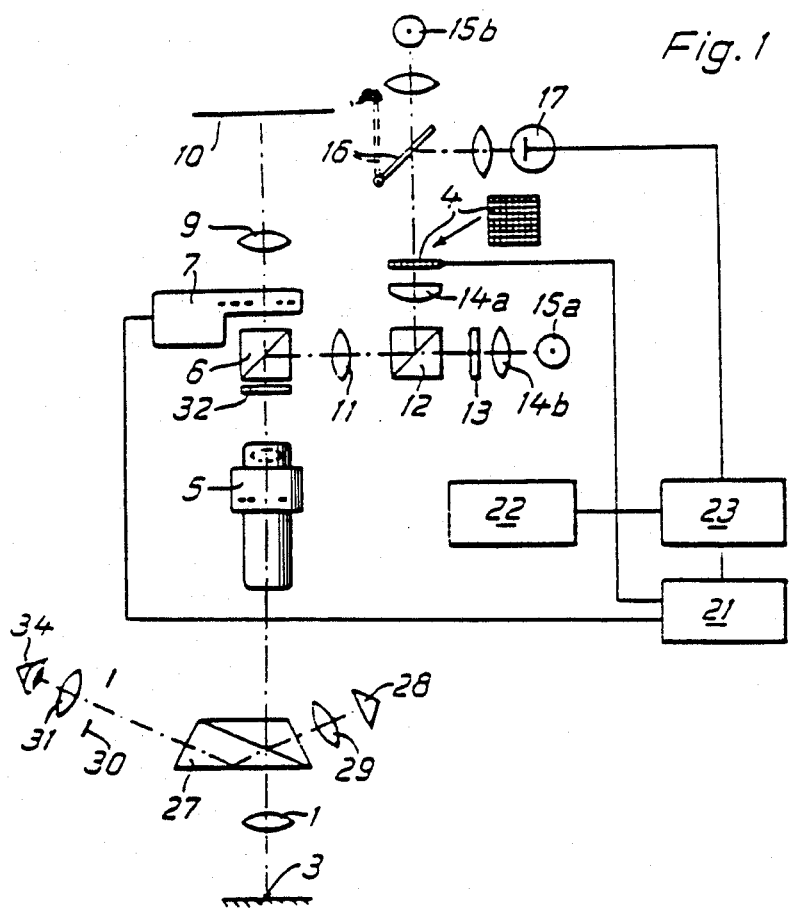
FIG. 1 shows a first version of an attachment camera, for microscopes, having a multifield matrix and separate format marking.

A tube beam splitter 27, which reflects some of the rays coming from the object 3 into an observation eyepiece 31, is arranged above a microscope objective 1. This part ray path, leading to the observer 34, is the actual observation ray path. A field stop 30 is arranged between the observation eyepiece 31 and the tube beam splitter 27 in an intermediate image plane The part of the beam passing through the tube beam splitter 27 reaches a photo eyepiece 5 and from there reaches a camera lens 9, via a depolarizing quartz plate 32 and through a first beam splitter 6 and a camera shutter 7, and then reaches the film plane 10. This—in the present case vertical—part ray path is the actual image-forming ray path. It is represented by the dot-dashed optical axis of the total system, the optical axis of the microscope and that of the camera coinciding with that of the total system.

A metering ray path is branched off at the first beam splitter 6 as a part ray path which passes through a metering objective 11, a second beam splitter 12 and, after being deflected, further passes through a field lens 14a and through a multifield matrix 4, located in an intermediate image plane and acting as a detail metering field stop. The metering ray bundle then hits a hinged mirror 16, which can be swiveled into two end positions. In place of a hinged mirror 16, a rotating mirror may, for example, alternatively be used. In the represented case, the hinged mirror 16 deflects the metering beam to a light sensor 17, for example a photomultiplier. In this position, the mirror simultaneously serves to cover and mask an illumination ray path which proceeds from a light source 15b and passes through a lens, not designated in greater detail. In the other end position of the hinged mirror 16, which is represented by the dashed lines, it ensures, from the view of the observer 34 or of the object 3, reverse—i.e. from the rear—illumination of the multifield matrix detail metering field stop. According to the respectively opened, i.e. switched to transparency, fields of the multifield matrix 4, a first image of this "stop" is projected into the intermediate image plane of the photo eyepiece 5. The rays then proceed further in the direction of the object 3 and are reflected by the reflective surface of the tube beam split-ter 27; they then reach a triple prism 28, via an image-forming lens 29, then proceed further through the image-forming lens 29 and through the tube beam splitter to the observation eyepiece 31, where a second image of the "stop" is produced. By superimposing this "stop" image on the object image in the eyepiece intermediate image plane, the observer 34 can see from which object detail the rays reach the light sensor 17 through the multifield matrix "stop", when the hinged mirror 16 is in the operational position shown in FIG. 1.

A graticule 13, which contains the format markings and a hair-line cross, is arranged beside the second beam splitter 12. This graticule 13 is also illuminated "from behind", via a field lens 14b by a light source 15a. An image of this graticule marking is also projected into the observation eyepiece 31, this second illumination part ray path proceeding, from the second beam splitter 12 onwards, in exactly the same fashion as the illumination part ray path of the "stop" described above.

The multifield matrix can be composed of a large number of individual fields. The fields preferably have a square shape. However, rectangular, triganol, hexagonal, circular, sectoral, arcuate or other polyganol field geometries are also possible. The fields are arranged in horizontal rows or in vertical columns, so that, for example, a checkered "matrix" results. However, other field arrangements are also possible, for example in the shape of spirals (bent or "pseudo-"spherical), radial segments with concentric circular subdivisions (inner ring, center ring, outer ring), in the shape of a hexagonal "beehive" structure, in the shape of a "circular" matrix, inter alia. For further details of the multifield matrix, reference is made to the embodiments described above.

The multifield matrix 4 is connected to a processor 22. If an object 3 is imaged on the multifield matrix 4, the processor 22 switches on and, after a release button not represented, is operated, clears, i.e. switches to transmissions, multifield matrix 4 individually in order. The light which passes through the respective opened field is measured simultaneously by the light sensor 17 and the measured values obtained are then fed to a computer 23. The computer 23, which also contains a storage unit, evaluates the individual measured brightness signals and stores the measured values of those fields which feature object image structures or object image structure details. The processor 22 then clears all those fields of the multifield matrix 4 which feature the determined object image structures or parts of structures. A detail metering field stop shape which is individually matched to the object image requirements is thus generated. In collaboration with the light sensor 17, the computer 23 then determines the ideal exposure time by determining the ratio of the cleared fields to the total number of all fields of the multifield matrix 4, and by taking into account the geometry of the cleared subregions of the multifield matrix 4. The exposure time values thus determined are fed, via a control unit 21, to a camera shutter 7, designed as a photographic shutter control unit, which then carries out its function in a known fashion. The basic mode of action of the present invention is represented by this course of the process.

For certain objects, it may be necessary, or at least expedient, for the observer 34 to visually compare the object image with the generated image of the metering spot (image of the multifield matrix "stop"). This is achieved, in the fashion described above, by means of an illumination ray bundle, proceeding from the light source 15b, with the hinged mirror 16 swiveled out of the ray path.

Figure 2:
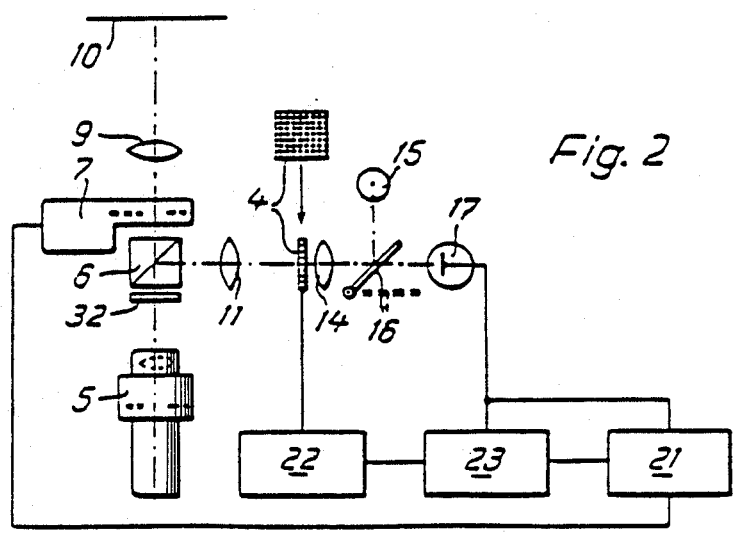
FIG. 2 shows an attachment camera, for microscopes with a multifield matrix without format marking.

In FIGS. 2 to 5 and 6, the actual microscope optics have been left out for simplification reasons. In principle, the part shown in FIG. 1 with the reference numbers 1, 3, 27–31 and 34 should in each case be provided beneath the photo eyepiece 5, always represented However, the tube beam splitter 27 with associated triple prism 28 can, in special cases, also be replaced by a conventional beam deflecting element, but the reflection of the detail metering field stop is not then vertically and laterally correct. In FIG. 2, a simplified version of what is represented in FIG. 1 is shown. The graticule with the format markings is omitted. The optical microscope part beneath the photoeyepiece 5 corresponds to the part shown in FIG. 1. However, a version without back-reflection can also be provided here. This simple version presents itself, for example, if the whole device according to the invention is to be attached to a commercial microscope which does not have a back-reflection device in the tube ("another make").

Figure 3:
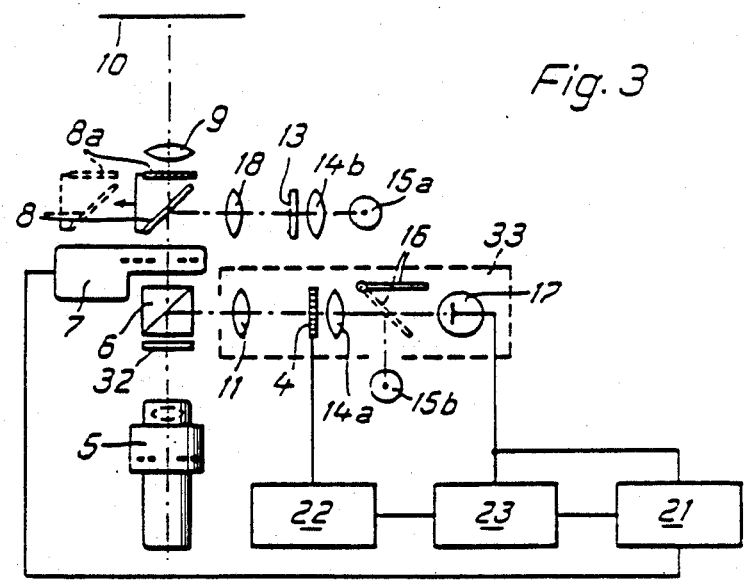
FIG. 3 shows a second version of an attachment camera, for microscopes, having a multifield matrix and separate format markings.

A further embodiment is shown in FIG. 3. Compared to the device represented in FIG. 1, it has expanded exposure dynamics The second beam splitter 12 is omitted (cf. FIG. 1), whereby an increased amount of light is obtained. A combination of components, comprising a mirror 8 and a dark flap 8a, which can be pushed out of the ray path, is represented in the camera-side ray path between the shutter 7 and the camera lens 9. In the operational position, this combination of components enables the reverse reflection of the graticule illumination ray path proceeding from the light source 15a. The back-reflection of the format marking thus occurs through the opened camera shutter 7 with the dark flap 8a closed.

Figure 4:
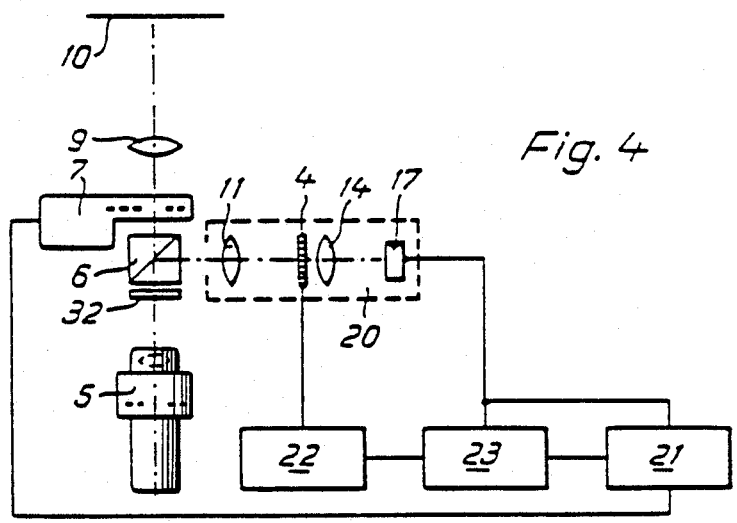
FIG. 4 shows an attachment camera, for microscopes, having a multifield matrix without format marking and without image back-reflection.

A further simple embodiment is shown in FIG. 4. Image back-reflection is not provided. The metering objective 11, the multifield matrix 4, the field lens 14 and the light sensor 17 are arranged in a module 20. This module 20 can be exchanged for a normal exposure metering and control device. It is possible to mount the beam splitter 6 so that it can be rotated or slid. This described version is thus interesting for microscopes which have a separate viewing telescope but no image back-reflection.

FIG. 5, in combination with FIG. 7, shows an embodiment having a further extended exposure dynamics compared to the versions shown in FIGS. 1 and 3. The omission of any beam splitter produces an enormous increase in brightness, which is extremely noticeable, in particular in the case of fluorescing specimens of low light intensity. The above illumination ray path, proceeding from the light source 15a, corresponds to the arrangement shown in FIG. 3; the actual microscope part corresponds to the arrangement shown in FIG. 1. A rotating sectored mirror 26, which is shown in plan view in FIG. 7, is located in the place of the first beam splitter 6. The representation in FIG. 5 shows the function of simultaneous observation of the "stop". In the "photography" position, the dark flap 8a, the mirror 8 and the hinged mirror 16 are swiveled out of the respective ray paths, while the sectored mirror 26 rotates and alternately allows the light for the metering or for the exposure of the film 10 to pass Further advantages of this embodiment are dark current compensation in the dark phases of the pulsing light flux; better recognizability of the back-reflected object ("blinking"); the full light flux can either reach the camera or be utilized for the metering.

FIG. 6 shows an attachment camera for optical instruments—the microscope part beneath the photo eyepiece 5 again corresponds to the representation given in FIG. 1, in which camera a diode array 25 is provided as light sensor. The diode array 25 is located—as is the multifield matrix 4 in all represented figures—in a plane which is conjugated with the eyepiece intermediate image plane. With respect to its individual field geometries or with respect to the field arrangement, the diode array 25 corresponds to the multifield matrix 4. By reverse illumination of the multifield matrix 4 by means of the light source 15, with the mirror 16 swiveled away and those fields of the multifield matrix 4 being cleared which correspond to the appropriate fields on the diode array 25 which had been subjected to light during the metering process previously carried out, the appropriate detail metering field stop shape and its relative position with respect to the entire object image is made visible to the observer 34.

The course of the process during this is as follows: the diode array 25, provided in a first plane, conjugated with the eyepiece intermediate image plane, and the multifield matrix 4, provided in a second plane, conjugated with the eyepiece intermediate image plane, are activated by the processor 22 in such a fashion that the metering field characteristics of the diode array and the transmission characteristics of the multifield matrix 4 are altered, spontaneously reversibly, according to the following process steps: after the object 3 has been imaged on the diode array 25, the processor, after a metering button, not represented, is operated, activates all fields of the diode array 25 individually one after the other, the light hitting each individual activated field simultaneously being metered and the individual measured values obtained being fed to the computer 23. The computer 23 evaluates the measured brightness signals and stores the measured values of those fields of the diode array 25 which feature object image structures or parts of object image structures. The computer then determines the ideal exposure time by determining the ratio of the fields having object image structures to the total number of all fields, by determination of the intensity of the metering signal, and by taking into account the geometry of the fields of the diode array 25 which are involved in the metering The observer 34 then visually compares the image of the object 3 with the detail metering field stop image imaged on the multifield matrix 4 or calculated, by optical superimposition of both images in the eyepiece intermediate image plane of the optical instrument by reverse illumination of the multifield matrix 4 by means of the light source 15. The exposure time values determined by the computer 23 are then fed to the camera shutter 7 and displayed, the shutter, after a release button, not represented, is operated, then carrying out its function in a known fashion. Further versions of the execution of the process according to the invention, and the corresponding devices, are described in detail in the claims and in the descriptive part above. In special cases, it may be expedient for some of the square fields, arranged, for example, in a checkered pattern, of the multifield matrix 4 to form other basic geometrical shapes, cf. claim 36, but under the condition that the area of each of these special fields matches the area of each of the normal fields. In this fashion, some special fields can be employed, for example, as optical format limiters, if the processor 22 merely sets four corner fields, which, to a certain extent, represent a light frame, to transmission. Other markings, such as crosses, arcs, segments, matrix center, etc. can also be recognized visually in this fashion using the multifield matrix 4 after reflection into the observation eyepiece 34. Because of the equal surface area special symbols, these parts of the multifield matrix 4 permit an equivalent light flux to the majority of uniformly-shaped matrix fields. In analogous fashion, the diode array 25 in the embodiment represented in FIG. 6 would have corresponding special fields.

I claim:

1. A process for providing at least one metering spot, with variable shape, size and location, in a ray path of a camera of an optical instrument, wherein a fixed-location, optionally reversibly illuminable multifield matrix, provided in the ray path in a place which is conjugated with an eyepiece intermediate image plane of the optical instrument, is activated by a processor in such a fashion that the transmission characteristics of the entire multifield matrix, or of at least one geometrical subregion of the matrix, are altered, spontaneously reversibly, according to the following steps:
   a. imaging an object image onto the multifield matrix;
   b. clearing all fields of the multifield matrix individually one after the other, with the processor upon receipt of a release signal, the light passing through each cleared field simultaneously being metered to obtain a measured value for each cleared field;
   c. evaluating with a computer the measured value for each cleared field and storing the measured values of those fields which feature object image structures or parts of object image structures.

2. The process claimed in claim 1, wherein the geometrical subregion which is activated comprises at least one field or one line of the multifield matrix.

3. The process claimed in claim 1, wherein the geometrical subregion which is activated comprises at least one physically adjacent group of fields or lines in the multifield matrix.

4. A process for providing at least one metering spot, with variable shape, size and location, in a ray path of a camera of an optical instrument, said process comprising the steps of:
   a. imaging an object image on a fixed-location, optionally reversibly illuminable, multifield matrix provided in the ray pat in a place which is conjugated with an eyepiece intermediate image plane of the optical instrument;
   b. clearing all fields of the multifield matrix individually, one after another, with a processor upon receipt of a release signal, the light passing through each cleared field simultaneously being metered by a photo-electric metering device and measured values of each cleared field obtained therefrom being supplied to a computer;
   c. evaluating the measured values of each cleared field with the computer and storing the measured values of those fields which feature object image structures or parts of object image structures;
   d. clearing all fields which feature object image structures or parts of object image structures with the processor;
   e. determining an ideal exposure time based on the ratio of the cleared fields to the total number of fields of the multifield matrix and the geometry of the cleared subregions of the multifield matrix;
   f. controlling a photographic shutter control unit based on the determined ideal exposure time; and
   g. comparing the object image visually with the metering spot image by optical superimposition of both images in the eyepiece intermediate image plane of the optical instrument by reverse illumination of the multifield matrix.

5. The process claimed in claim 4, further comprising the step of displaying the determined ideal exposure time on a display on the shutter control unit.

6. The process claimed in claim 4, further comprising the step of preprogramming contrast ranges which are acceptable for recording purposes into the computer, taking into account the exposure latitude of the appropriate film used in the camera of the optical instrument, which are used for the determination of the desired shape, size and position of the metering spot.

7. The process claimed in claim 4, further comprising the step of manually entering contrast ranges into the computer which are used for the determination of the desired shape, size and position of the metering spot.

8. The process claimed in claim 4, further comprising the step of programming the computer with a correction factor for weighing the measured values.

9. The process claimed in claim 4, wherein the computer automatically corrects or compensates for any transmission inhomogeneities of individual fields of the multifield matrix.

10. The process claimed in claim 4, wherein the processor alternately changes, individually or in groups, the transmission characteristics of the fields in a prespecified interval sequence.

11. The process claimed in claim 4, wherein the processor initially clears one field lying in the central region of the multifield matrix and then clears the neighboring fields one after the other.

12. The process claimed in claim 11, wherein the successive clearing of neighboring fields is carried out along a spiral line originating from the center of the multifield matrix.

13. A process for providing at least one metering spot, with variable shape, size and location, in a ray path of a camera of an optical instrument, said process comprising the steps of:
   a. imaging an object image on a diode array provided in the metering ray path in a first plane which is conjugated with an eyepiece intermediate image plane of the optical instrument;
   b. activating all fields of the diode array individually, one after the other, with a processor, the light hitting each activated field simultaneously being metered and the individual measured values obtained therefrom being fed to a computer;
   c. evaluating with the computer the individual measured values and storing the individual measured values of those fields of the diode array which feature object image structures of parts of object image structures;
   d. determining with the computer an ideal exposure time based on a ratio of the fields having object structures or parts of object structures to the total number of all fields of the diode array and geometry of the fields of the diode array;
   e. controlling a photographic shutter control unit based on the determined ideal exposure time;
   f. clearing those fields of an optionally reversibly illuminable multifield matrix, arranged in a second plane conjugated with the first plane, which correspond to the fields of the diode array which feature object image structures or parts of object image structures;
   g. comparing the object image visually with the metering spot image, formed on the multifield matrix, by optical superimposition of both images in the eyepiece intermediate image plane of the optical instrument by reverse illumination of the multifield matrix.

14. The process claimed in claim 13, further comprising the step of displaying the determined ideal exposure time on a display on the shutter control unit.

15. The process claimed in claim 13, further comprising the step of preprogramming contrast ranges which are acceptable for recording purposes into the computer, taking into account the exposure latitude of the appropriate film used in the camera of the optical instrument, which are used for the determination of the desired shape, size and position of the metering spot.

16. The process claimed in claim 13, further comprising the step of manually entering contrast ranges into the computer which are used for the determination of the desired shape, size and position of the metering spot.

17. The process claimed in claim 13, further comprising the step of programming the computer with a correction factor for weighing the measured values.

18. The process claimed in claim 13, wherein the computer automatically corrects or compensates for any transmission inhomogeneities of individual fields of the multifield matrix.

19. The process claimed in claim 13, wherein the processor alternately changes, individually or in groups, the transmission characteristics of the fields in a prespecified interval sequence.

20. The process claimed in claim 13, wherein the processor initially clears one field lying in the central region of the multifield matrix and then clears the neighboring fields one after the other.

21. The process claimed in claim 20, wherein the successive clearing of neighboring fields is carried out along a spiral line originating from the center of the multifield matrix.

22. An optical viewing apparatus comprising:
a. imaging means for imaging an object image on a fixed-location, optionally reversibly illuminable, multifield matrix provided in a ray path of the optical viewing apparatus, in a place which is conjugated with an eyepiece intermediate image plane of the optical viewing instrument;
b. processing means, coupled to said multifield matrix for controlling the transmission characteristics of the individual fields of the multifield matrix;
c. metering means for metering the amount of light from the object image and generating a measured value signal corresponding to each of the individual fields of the multifield matrix;
d. control means for receiving and evaluating the measured value signals and storing the measured value signals of those fields which correspond to object image structures or parts of object image structures in a storage means, and for controlling the processing means to clear all fields of the multifield matrix which correspond to object image structures or parts of object image structures to generate a metering field stop shape that matches the object image, the control means including computing means for determining an ideal exposure time based on the ratio of cleared fields present in the metering field stop shape to the total number of fields of the multifield matrix, and the geometry of the cleared fields;
e. means for controlling a photographic shutter control unit based on the determined ideal exposure time determined by said computing means; and
f. illumination means for illuminating the metering field stop shape to produce a metering spot image; and
g. means for superimposing the object image with the metering spot image in an eyepiece intermediate image plane of the optical instrument.

23. An optical viewing apparatus as claimed in claim 22, wherein said multifield matrix is comprised of an electro-optic material.

24. An optical viewing apparatus as claimed in claim 22, wherein said multifield matrix is comprised of a ferro-electric material.

25. An optical viewing apparatus as claimed in claim 22, wherein the multifield matrix is a liquid crystal matrix.

26. An optical viewing apparatus as claimed in claim 22, wherein the multifield matrix contains nematic liquid crystals with positive dielectric anisotropy.

27. An optical viewing apparatus as claimed in claim 22, wherein the multifield matrix comprises an electrochromic matrix.

28. An optical viewing apparatus as claimed in claim 22, wherein the multifield matrix comprises an electrophoretic matrix.

29. An optical viewing apparatus as claimed in claim 22, wherein individual fields of the multifield matrix comprise different matrix materials.

30. An optical viewing apparatus as claimed in claim 29, wherein the different matrix materials are distributed among the individual fields such that subregions of the multifield matrix of identical surface areas are alternately furnished with different matrix materials.

31. An optical viewing apparatus as claimed in claim 22, wherein all of the fields of the multifield matrix are of the same geometry and have the same surface area.

32. An optical viewing apparatus as claimed in claim 22, wherein the shape of each field of the multifield matrix is at least one of a square, a rectangle, a rhombus, a parallelogram, a trapezoid, a triangle, and a hexagon.

33. An optical viewing apparatus as claimed in claim 22, wherein all individual fields of the multifield matrix have surface geometries which differ from one another while having the same surface areas.

34. An optical viewing apparatus as claimed in claim 22, wherein a plurality of the individual fields of the multifield matrix are designed as equal surface area format limiting and centering symbols.

35. An optical viewing apparatus as claimed in claim 22, wherein the multifield matrix has a polar coordinate structure proceeding radially from its center and all individual fields have the same surface area.

36. An optical viewing apparatus as claimed in claim 22, further comprising means for providing a graticule image in the image plane of the eyepiece.

37. An optical viewing apparatus as claimed in claim 22, wherein the metering means comprises a diode array coupled to said processing means, which is conjugated with the eyepiece intermediate image plane, the diode array having individual diode geometries and arrangements corresponding to individual fields of the multifield matrix, and the processing means selectively activating the individual diodes of the diode array.

38. An optical viewing apparatus as claimed in claim 22, wherein the metering means comprises a photomultiplier tube located behind the multifield matrix, and the processing means clears each individual field of the multifield array on receipt of a release signal so that light passing through each cleared field is simultaneously measured by the photomultiplier tube.

39. An optical viewing apparatus as claimed in claim 22, wherein said multifield matrix comprises two multifield matrices layered on one another in a sandwich fashion, each of said two matrices being separately controllable by the processing means and arranged so that they can be lined with one another bifunctionally.

* * * * *